United States Patent
Gandhi

(10) Patent No.: US 10,422,401 B2
(45) Date of Patent: Sep. 24, 2019

(54) ENERGY-ABSORBING STRUCTURE FOR VEHICLE

(71) Applicant: Toyota Motor Engineering & Manufacturing North America, Inc., Erlanger, KY (US)

(72) Inventor: Umesh N. Gandhi, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/202,572

(22) Filed: Jul. 6, 2016

(65) Prior Publication Data

US 2018/0010663 A1    Jan. 11, 2018

(51) Int. Cl.
*F16F 7/12* (2006.01)
*B60R 19/34* (2006.01)
*B62D 21/15* (2006.01)

(52) U.S. Cl.
CPC .............. *F16F 7/12* (2013.01); *B60R 19/34* (2013.01); *F16F 7/124* (2013.01); *F16F 7/125* (2013.01); *B62D 21/152* (2013.01); *F16F 2224/0241* (2013.01)

(58) Field of Classification Search
CPC ...... F16F 7/12; F16F 7/07; F16F 7/124; F16F 2224/0241; B62R 19/34; B62D 21/152; B62D 25/08
USPC ......................... 188/377, 376, 371; 293/133; 296/187.03, 187.09, 187.1, 187.11
See application file for complete search history.

(56) References Cited

U.S. PATENT DOCUMENTS

| | | | | |
|---|---|---|---|---|
| 3,552,525 A | * | 1/1971 | Schudel | F16F 7/121 188/377 |
| 5,351,791 A | * | 10/1994 | Rosenzweig | B60R 19/36 188/372 |
| 6,062,355 A | * | 5/2000 | Nohr | F16F 7/123 188/371 |
| 6,959,894 B2 | * | 11/2005 | Hayashi | B64C 1/062 188/377 |
| 7,458,450 B2 | * | 12/2008 | Karaki | B60R 19/00 188/376 |

(Continued)

FOREIGN PATENT DOCUMENTS

| | | | |
|---|---|---|---|
| JP | 2011111113 A | * 6/2011 | |
| JP | 2013060189 A | * 4/2013 | ......... B60R 21/0132 |

OTHER PUBLICATIONS

Machine Translation in English for JP 2011-111113A; Inventors: Haneda et al.; 7 pages; Retrieve Date: Nov. 21, 2018.*

*Primary Examiner* — Thomas J Williams
*Assistant Examiner* — James K Hsiao
(74) *Attorney, Agent, or Firm* — Christopher G. Darrow; Darrow Mustafa PC

(57) ABSTRACT

An energy-absorbing structure includes a first mounting fixture having a base and a cavity formed in the base. The cavity is structured to receive a portion of an energy-absorbing member therein. The cavity has at least one wall, a bottom, and at least a pair of opposed crush initiator portions extending between the at least one wall and the bottom. A portion of an energy-absorbing member is inserted into the cavity. The energy-absorbing member is in contact with the first mounting fixture along the first mounting fixture crush initiator portions.

20 Claims, 5 Drawing Sheets

(56) References Cited

U.S. PATENT DOCUMENTS

| | | | | |
|---|---|---|---|---|
| 7,900,964 B2* | 3/2011 | Chretien | .............. | B62D 21/152 |
| | | | | 180/274 |
| 8,857,894 B2* | 10/2014 | Grall | ....................... | B60R 19/34 |
| | | | | 188/377 |
| 9,045,099 B2* | 6/2015 | Merulla | ................ | B62D 21/152 |
| 9,126,551 B2* | 9/2015 | Impero | ................... | B60R 19/34 |
| 9,598,035 B2* | 3/2017 | Mukainakano | ......... | B60R 19/26 |
| 2002/0043809 A1* | 4/2002 | Vismara | .................. | B60R 19/18 |
| | | | | 293/133 |
| 2009/0026777 A1* | 1/2009 | Schmid | ................... | B60R 19/34 |
| | | | | 293/133 |
| 2010/0072788 A1* | 3/2010 | Tyan | .................... | B62D 21/152 |
| | | | | 296/205 |
| 2011/0015902 A1* | 1/2011 | Cheng | ................. | B62D 21/152 |
| | | | | 703/1 |

\* cited by examiner

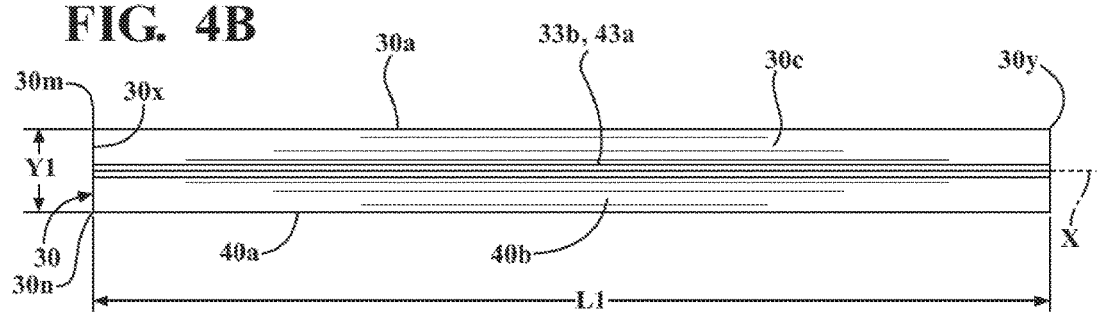
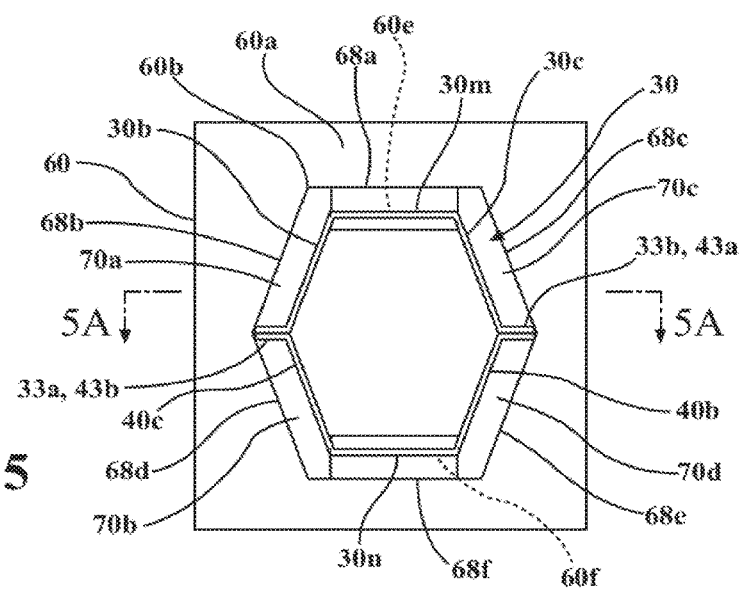
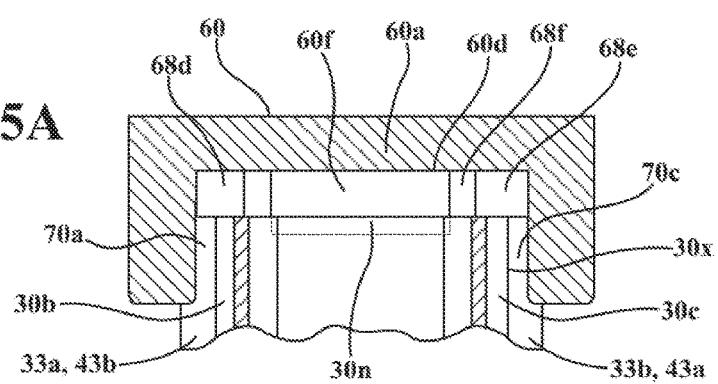

US 10,422,401 B2

1

ENERGY-ABSORBING STRUCTURE FOR VEHICLE

TECHNICAL FIELD

The embodiments described herein relate to energy-absorbing structures designed to absorb impact loads.

BACKGROUND

Elongated energy-absorbing structures such as vehicle lower rails may be designed to absorb impact loads during front and rear-end collisions, for example. It is generally desirable to design such structures so as to maximize energy-absorption while minimizing the weight and bulk of the structure. However, existing designs may absorb energy in a manner which leads to undesirable bucking failure at an unpredictable location along the length of the rail. A design which fails in such a mode may be relatively inefficient and ineffective as an energy absorber.

SUMMARY

In one aspect of the embodiments described herein, an energy-absorbing structure is provided. The structure includes a first mounting fixture having a base and a cavity formed in the base. The cavity is structured to receive a portion of an energy-absorbing member therein. The cavity has at least one wall, a bottom, and at least a pair of opposed crush initiator portions extending between the at least one wall and the bottom. A portion of an energy-absorbing member is inserted into the cavity. The energy-absorbing member is in contact with the first mounting fixture along the first mounting fixture crush initiator portions.

In another aspect of the embodiments described herein, a mounting fixture for an energy-absorbing structure is provided. The mounting fixture includes a base and a cavity formed in the base. The cavity is structured to receive a portion of an energy-absorbing member therein. The cavity has at least one wall, a bottom, and at least a pair of opposed crush initiator portions extending between the at least one wall and the bottom.

BRIEF DESCRIPTION OF THE DRAWINGS

FIG. 4B shows an side view of the energy-absorbing member of FIG. 4.

FIG. 5 shows an end view of the energy-absorbing member of FIG. 4 inserted into a cavity formed in the mounting fixture shown in FIG. 6.

2

FIG. 5A is a plan cross-sectional view of a portion of the energy-absorbing member inserted into the mounting fixture cavity as shown in FIG. 5.

Figure 1:
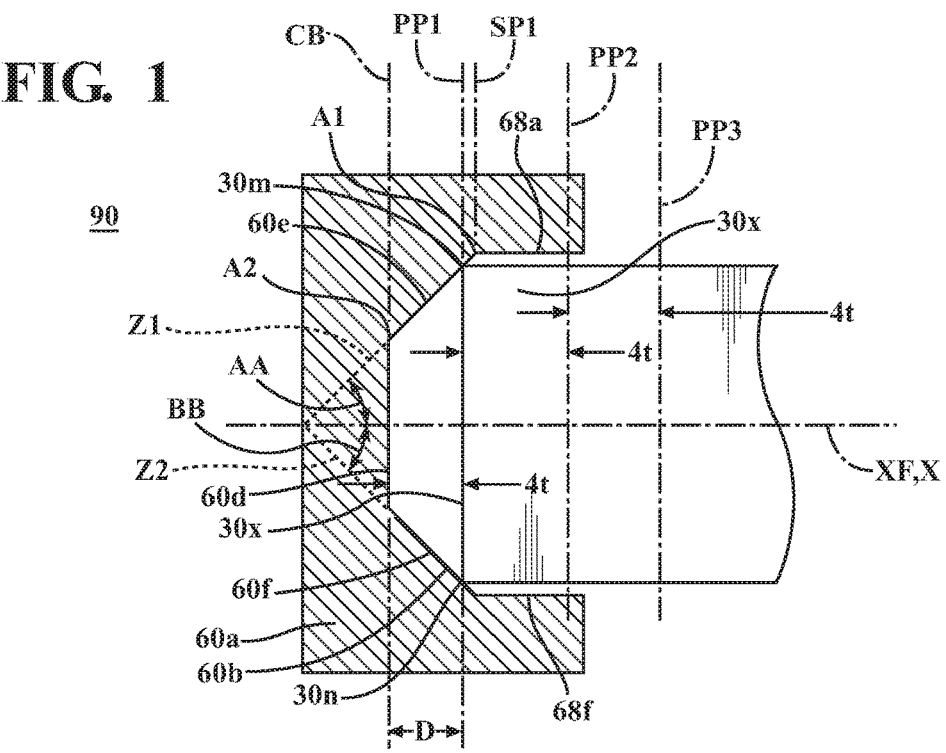
FIG. 1 is a cross-sectional side view of a portion of an energy-absorbing structure in accordance with one embodiment described herein, prior to application of an axial load to the structure.
Figure 6:
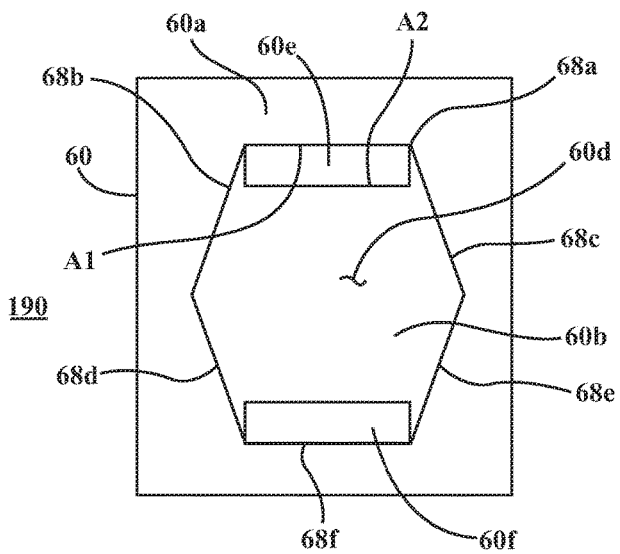

FIG. 6 shows a frontal view of the mounting fixture shown in FIG. 1, without an energy-absorbing member inserted therein.

Figure 7A:
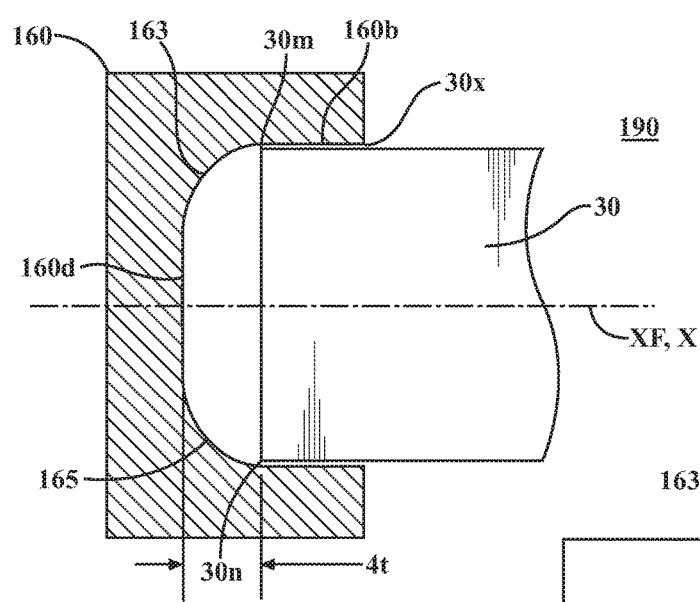

FIG. 7A is a cross-sectional side view of an energy-absorbing structure including an alternative embodiment of a mounting fixture.

Figure 7B:
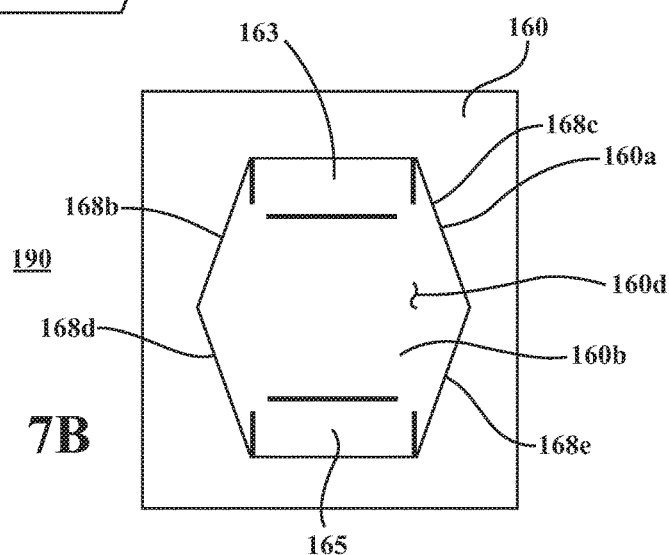

FIG. 7B is a frontal view of the mounting fixture shown in FIG. 7A.

Figure 8:
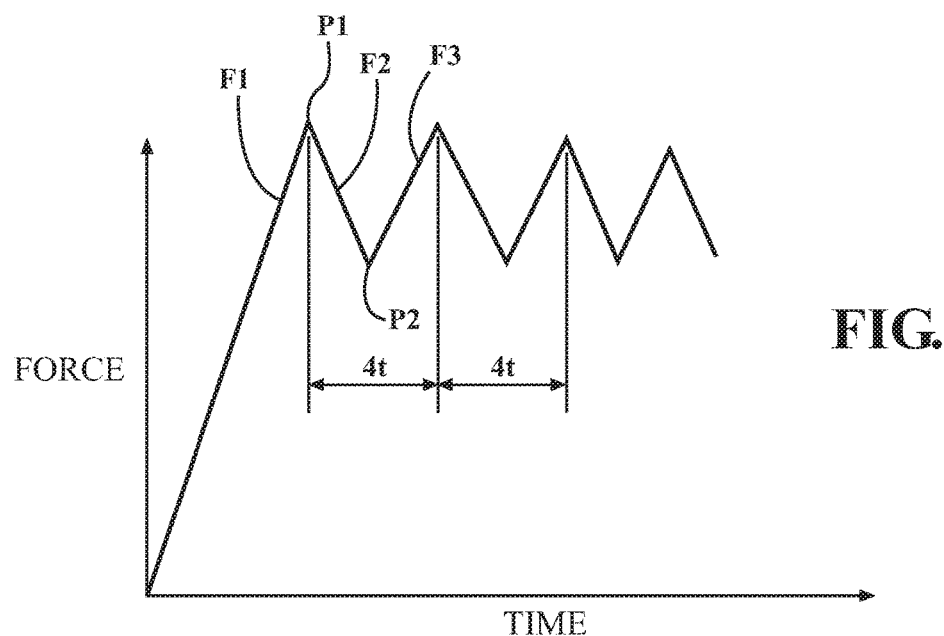

FIG. 8 is a graphical representation of the variation in loading on an end of an energy-absorbing member in accordance with an embodiment described herein, during progressive crushing.

Figure 9:
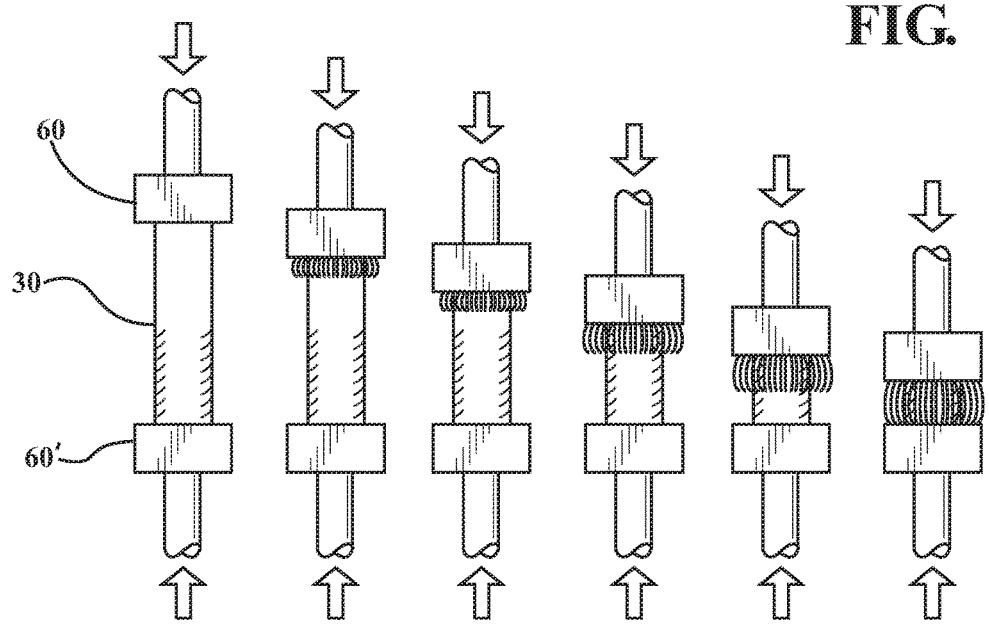

FIG. 9 is a schematic side view of an energy-absorbing structure in accordance with an embodiment described herein, showing progressive axial crushing of an energy-absorbing member responsive to an axially applied load.

DETAILED DESCRIPTION

Embodiments of energy-absorbing structures described herein are configured to absorb impact energy by crushing in a progressive manner, in which crushing initiates at an end of a member secured in a mounting fixture and then progresses along at least a portion of the remainder of the member in a controlled fashion, as shown in FIG. 9.

Progressive axial crushing of an elongated energy-absorbing member as described herein may be defined as a gradual fracturing and displacement of the member material, beginning at one or more ends of the structure and proceeding along a length of the structure while the load is applied, and without buckling of the member. Buckling may be defined as a sudden sideways failure of a structural member subjected to a high compressive axial load, where the compressive stress at the point of failure is less than the ultimate compressive stress that the material is capable of withstanding.

Figure 2:
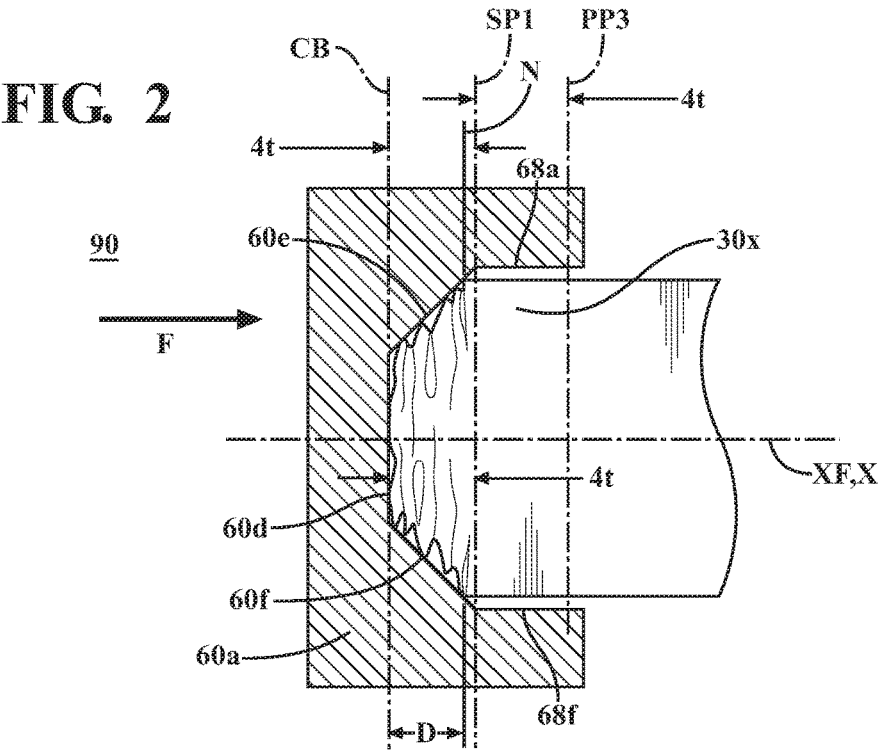
FIG. 2 is the cross-sectional side view of FIG. 1 illustrating progressive crushing of an end portion of an energy-absorbing member responsive to an applied load F.
Figure 3:
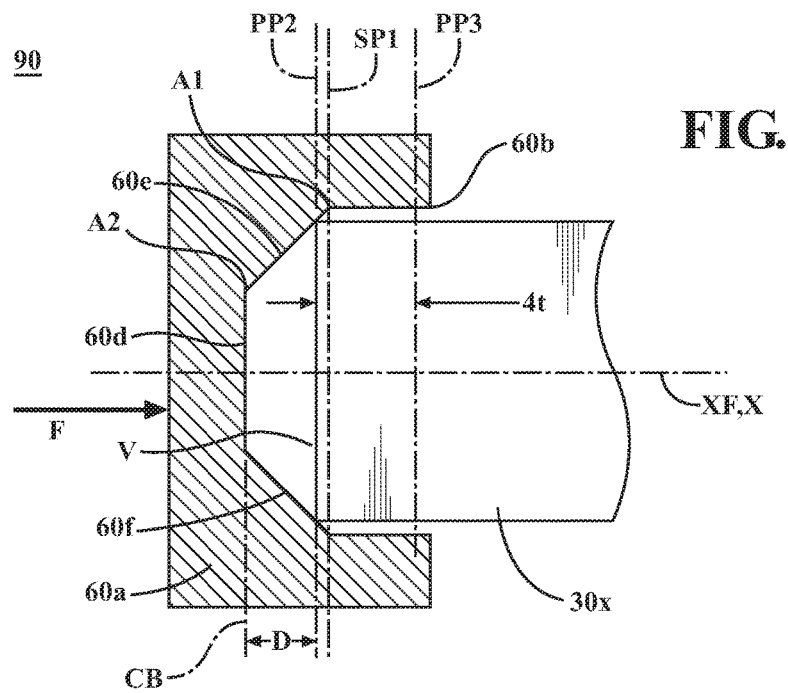
FIG. 3 is the cross-sectional side view of FIGS. 1 and 2 shown after pieces of the crushed end portion of the energy-absorbing member have fallen away from the end of the member, and after an uncrushed portion of the member has made contact with the mounting fixture.
Figure 4:
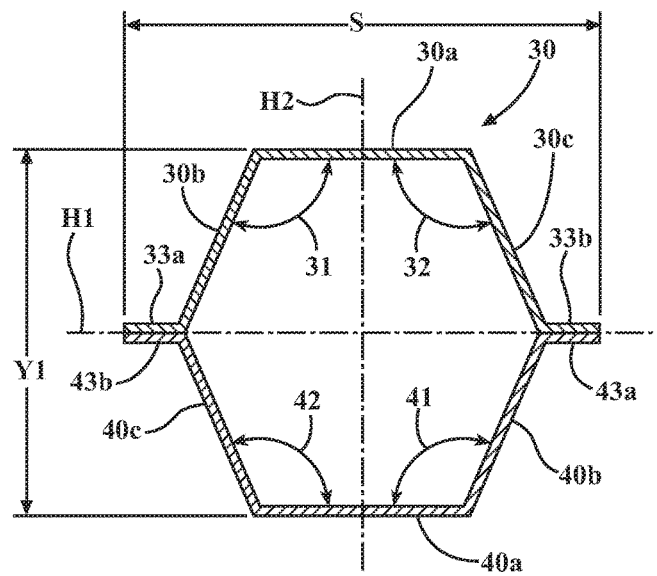
FIG. 4 shows an end cross-sectional view of an energy-absorbing member in accordance with one embodiment described herein.
Figure 4A:
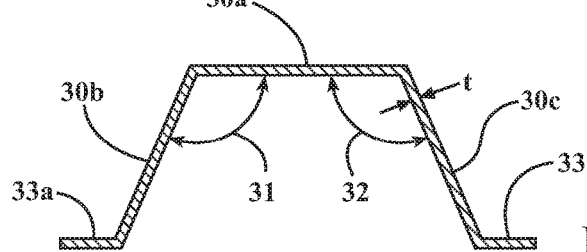
FIG. 4A shows an end view of a part from which the member of FIG. 4 may be formed.

FIGS. 1-6 show an energy-absorbing structure 90 and associated components in accordance with one embodiment described herein. FIG. 4 shows an end cross-sectional view of an energy-absorbing member 30 in accordance with one embodiment described herein. FIG. 4A shows an end view of a part from which the member of FIG. 4 may be formed. FIG. 4B shows an side view of the member 30 of FIG. 4. As used herein, "longitudinal" means "of or relating to length or the lengthwise dimension".

In the embodiment shown in FIGS. 4-4B, the energy-absorbing member 30 is hollow, with a first wall portion 30a, a second wall portion 30b forming a first obtuse internal angle 31 with the first wall portion, and a third wall portion 30c positioned opposite the second wall portion 30b. The third wall portion 30c forms a second obtuse internal angle 32 with the first wall portion 30a. An "internal angle" is an angle formed between two adjacent wall portions of the member 30 and residing within an interior of the finished member. A weld flange 33a projects from an end of the second wall portion 30b, and another weld flange 33b projects from an end of the third wall portion 30c. Also, in the embodiment shown, the energy-absorbing member 30 has a fourth wall portion 40a opposite the first wall portion 30a, a fifth wall portion 40b forming a third obtuse internal angle 41 with the fourth wall portion 40a, and a sixth wall portion 40c positioned opposite the fifth wall portion 40b. The sixth wall portion 40c forms a fourth obtuse internal angle 42 with the fourth wall portion 40a. A weld flange 43a projects from an end of the fifth wall portion 40b, and another weld flange 43b projects from an end of the sixth wall portion 40c. Referring to FIG. 4B, the embodiment shown has a longitudinal axis X. An end 30x of the member 30 is structured to be mounted in a mounting fixture 60 as described herein so that a load (such as an impact load) F applied to the mounting fixture acts in a direction along or parallel to axis X and is transmitted to the member 30 so as to induce progressive crushing of the member 30.

The embodiment shown in FIG. 4 may be formed by taking two separate parts having the cross-sectional shape shown in FIG. 4A and positioning them with respect to each other as shown in FIG. 4. The parts may then be joined along the flanges 33a, 43b and 33b, 43a using heat staking, welding, or any other suitable technique. The cross-section of FIG. 4 has mutually perpendicular planes of symmetry H2 and H1. A plane of symmetry may be defined as a plane that divides the member 30 into two symmetrical parts in such a way that the portion of the part on one side of the plane is a mirror image of the portion of the part on an opposite side of the plane.

The overall dimensions of the energy-absorbing member 30 may be specified so as to meet particular progressive crush and/or impact absorbing requirements, according to the needs of a given application. Referring to FIGS. 4 and 4B, in a particular embodiment, the energy-absorbing member 30 has a width dimension S in the range 80-160 millimeters inclusive, a length dimension L1 in the range 400-800 millimeters inclusive, a height dimension Y1 in the range 30-40 millimeters inclusive, and a material thickness (or wall thickness) tin the range 1.5-3 millimeters inclusive. To help ensure the desired progressive crushing response to the applied loads as described herein, the wall thickness t of the energy-absorbing member is made constant throughout the member, within the limits of manufacturing tolerances.

FIGS. 1-3, 5, 5A, and 6 show various views of an embodiment of a mounting fixture 60 structured for receiving an end of an energy-absorbing member (such as end X1 of member 30) therein. FIGS. 1-3 show cross-sectional side views of the mounting fixture 60. FIG. 6 shows a frontal view of the mounting fixture shown in FIG. 1. The mounting fixture 60 has a base 60a and a cavity 60b formed in the base. In embodiments described herein, the particular dimensions of the mounting fixture and the cavity may be determined responsive to the geometry of the energy-absorbing member. Thus, the energy-absorbing member may be designed first and the mounting fixture dimensions specified so as to provide the desired crush response of the energy-absorbing member. The mounting fixture 60 may be formed from steel, aluminum, or any other material suitable for the purposes described herein.

Mounting fixture 60 may be structured for attachment to a portion of a vehicle (for example, a bumper) so as to transfer an external load impinging on the vehicle portion to an energy-absorbing member mounted therein. The cavity 60b is structured to receive a portion of an energy-absorbing member (such as member 30 previously described) therein. Embodiments of the cavity 60b have at least one wall. The wall may be a continuous wall (such as a curved wall) extending around and defining the cavity 60b. Alternatively, the cavity may include wall sections (such as straight sections or curved sections) joined at ends thereof to form a continuous enclosure. In the embodiment shown in FIGS. 1-3, 5, 5A, and 6, cavity 60b has wall sections 68a-68f. In particular embodiments, these cavity wall sections may intersect to form a cavity having the same general cross-sectional shape as the member 30 previously described. In addition, the cavity wall sections may be structured so that each wall section is positioned opposite and spaced apart from a corresponding wall portion of the energy-absorbing member 30 when the member is inserted into the cavity as shown in FIGS. 1-3, 5 and 5A. This spacing provides clearance regions or gaps 70a-70d adjacent member wall portions 30b, 40c, 30c and 40b, respectively. Fractured energy-absorbing member material in the form of particles or flakes may exit from the cavity 60b through these gaps during progressive crushing of the member 30. Fractured energy-absorbing member material may also enter the hollow center of the member 30.

Referring to FIG. 5 for example, which shows an end view of a member 30 inserted into a cavity 60b of an associated mounting fixture 60, the cavity 60b is structured responsive to the energy-absorbing member geometry so that member second wall portion 30b will be spaced apart from cavity wall section 68b so as to form a gap 70a therebetween when an end of the member 30 is inserted into the cavity 60b. Similarly, member third wall portion 30c is spaced apart from cavity wall section 68c so as to form a gap 70c, member sixth wall portion 40c is spaced apart from cavity wall section 68d so as to form a gap 70b, and member fifth wall portion 40b is spaced apart from cavity wall section 68e so as to form a gap 70d.

Referring to FIGS. 1-3 and 6, cavity 60b also has a bottom 60d and at least a pair of crush initiator portions 60e and 60f connecting associated wall portions with the bottom 60d. Crush initiator portions 60e and 60f may be positioned on opposite sides of the cavity 60b and are configured to contact corresponding opposite member edge portions 30m and 30n of member end 30x when the member 30 is inserted into the mounting fixture 60. In the embodiment shown in FIGS. 1-3 and 6, crush initiator portions 60e and 60f are positioned along cavity wall sections 68a and 68f and extend between the cavity wall sections and cavity bottom 60d.

Cavity 60b may have an energy-absorbing member insertion axis XF extending along an insertion direction of the energy-absorbing member 30 into the cavity. The insertion axis XF is an axis along which an associated energy-absorbing member is to be inserted during assembly of the energy-absorbing structure so as to contact the crush initiator portions in a manner designed to produce the load-responsive progressive-crushing effects described herein. In the embodiment shown, cavity bottom 60d is flat and forms a plane CB extending perpendicular to the axis XF. In particular embodiments, the longitudinal axis X of the member 30 and the insertion axis XF are coaxial when the member 30 is inserted into the cavity 60b and positioned in contact with the crush initiator portions as described herein. In the embodiments shown, the crush initiator portions 60e and 60f may be structured such that a cross-sectional area of the cavity 60b taken along a plane perpendicular to the cavity insertion axis XF and extending through the crush initiator portions decreases in a direction proceeding toward the cavity bottom 60d. In the embodiment shown in FIGS. 1-3, crush initiator portions 60e and 60f are in the form of flat beveled surfaces, each surface extending between an associated cavity wall section and the bottom 60d of the cavity, each surface extending along a plane residing at an angle with respect insertion axis XF. As seen in FIG. 1, a plane Z1 containing a first crush initiator portion 60e forms and angle AA with the insertion axis XF, while another plane Z2 containing a second crush initiator portion 60f forms an angle BB with the insertion axis XF. In particular embodiments, the angles AA and BB are equal. In particular embodiments, the angles AA and BB are both in the range of 35° to 60° inclusive. In a particular embodiment, the angles are both approximately 45°.

Also, the crush initiator portions 60e and 60f may be structured to intersect respective cavity wall sections 68a and 68f at locations spaced equal distances apart from cavity bottom 60d. Thus, in the embodiment shown in FIGS. 1-3, crush initiator portions 60e and 60f intersect respective cavity wall sections 68a and 68f along a plane PP1 extending perpendicular to insertion axis XF.

Referring to FIG. 1, a distance D may be defined as a distance between the cavity bottom 60d and a plane PP1 extending perpendicular to the energy-absorbing member longitudinal axis X and passing through locations at which member edge portions 30m and 30n intersect the crush initiator portions 60e and 60f. The distance D may be specified so as to provide sufficient cavity volume between member end 30x, the cavity bottom 60d and the cavity wall sections 68a-68f to enable the material of a predetermined length of member 30 to fracture and crush into the cavity volume. The minimum distance D needed to meet this criterion for any particular application may depend on such factors as the energy-absorbing member material thickness t, the failure strain and elastic modulus of the energy-absorbing member material used, and other pertinent factors. In some embodiments, the distance D is at least 3t, where t is equal to a wall thickness of a material from which a portion of the energy-absorbing member in contact with the crush initiator portions is fabricated. In a particular embodiment, the distance D is approximately 4t. This may accommodate collapse into the cavity 60b of a portion of the member 30 having a length of 4t from the end 30x of the member.

A depth of the cavity 60b between the cavity bottom 60d and the plane SP1 passing through locations where the crush initiator portions 60e and 60f intersect associated wall sections of the cavity may be greater than the distance D, to help ensure that the member edge portions 30m and 30n contact the crush initiator portions 60e and 60f. For example, in an embodiment where the distance D is approximately 4t, a depth of the cavity 60b between the cavity bottom 60d and a plane SP1 passing through locations where the crush initiator portions 60e and 60f intersect associated wall sections of the cavity may be greater than 4t, as shown in FIG. 1.

The failure mechanism which produces progressive crushing of the member 30 is illustrated in FIGS. 1-3. FIG. 1 shows a side cross-sectional view of a portion of an energy-absorbing structure 90 in accordance with an embodiment described herein. Energy-absorbing member 30 has an end 30x with energy-absorbing member edge portions 30m and 30n in contact with the crush initiators 60e and 60f of an embodiment 60 of the mounting fixture, prior to application of a load to the mounting fixture. The mounting fixture 60 may be secured to a portion of a vehicle, for example, a front or rear bumper. The end 30x of member 30 contacts the crush initiators 60e and 60f initially along plane PP1. Another plane PP2 is spaced approximately 4t from plane PP1. Also, as seen in FIGS. 1-3, when the energy-absorbing structure 90 is properly positioned and mounted in a vehicle for absorbing a load, the end 30x of the energy-absorbing member may be in contact with the mounting fixture 60 only along the crush initiators 60e and 60f.

Referring to FIG. 2, upon application of a load F (such as an impact load), stresses on the portions of the member end 30x in contact with the crush initiators 60e and 60f increase until these portions of the member material fracture generally inwardly (in the general direction of axes X and XF) and into the portion of the cavity 60b between the end of the energy-absorbing member and cavity bottom 60d. The fractured material may be ground into small pieces which fall out of the cavity 60b or are forced out of the cavity through the gaps 70a-70d previously described. In the embodiment shown, which has a distance D of at least 4t (i.e. four material thicknesses), a length of member 30 of approximately 4t may collapse into the cavity, thereby providing a localized failure boundary N (FIG. 2) located at approximately four material thicknesses from the end 30x of the member.

As application of the load F continues, continued fracture and displacement of the member material causes the portions of the member 30 contacting the crush initiators 60e and 60f to migrate progressively in the direction of the applied force F, proceeding down the length of the member 30. When the material between planes PP1 and PP2 has been crushed as shown in FIG. 2, the end of member 30 is now in contact with the crush initiators 60e and 60f along plane PP2, and the sequence just described is repeated. As the portions of the member 30 in contact with the crush initiators 60e and 60f migrates progressively down the length of the member 30, failure of the migrating member end portion 30x is repeated, with failure zones having lengths of approximately 4t fracturing successively as described above and as shown in FIGS. 1-3.

The forces experienced by the member 30 during this process are characterized in FIG. 8, which shows variation of the loading on the member 30 during progressive crushing. In region F1, upon initial application of the load F, the loading on the end 30x of the member 30 increases until the material reaches a failure load at P1. The stresses in the material are then relieved over region F2 by collapse of the material. That is, a length of member material up to approximately distance D from the member end collapses into the cavity 60b. At P2, the "new" end portions of the member (formed from as yet uncollapsed material) makes contact with the crush initiators 60e and 60f, at which point the load on the new end portions starts to increase. The process continues until the applied load is removed or reduced to a level below which crushing of the member 30 may be continued, or until the crushing is physically limited (for example, by a hard stop). The amount of material at the end of member 30 which may be crushed in a given collapse sequence may be adjusted by adjusting the distance D. The distance D desirable for any particular application may be determined analytically and/or experimentally, using known methods.

Referring to FIGS. 7A and 7B, in an alternative embodiment 190 of the energy-absorbing structure, the mounting fixture base portion 160a has a cavity 160b with a bottom 160d. Walls or wall sections 168b, 168c, 168d, 168e in cavity 160b may be as described previously with respect to the embodiment of FIGS. 1-3. The crush initiator portions are in the form of radii 163 and 165 formed at intersections of opposed respective cavity wall sections and the bottom 160d, as previously described with respect to FIGS. 1-3. In particular embodiments, the radii 163 and 165 may be equal to at least 4t, to enable a crush zone of length 4t as previously described.

In particular embodiments, the energy-absorbing structures described herein are configured to facilitate progressive crushing of associated energy-absorbing members responsive to impact loads which may be applied, for example, over a period of 40-100 milliseconds. In particular embodiments of the energy-absorbing structure, each end 30x and 30y of the energy-absorbing member 30 may be mounted in a mounting fixture similar to an embodiment of the mounting fixture described herein. In such embodiments, progressive crushing of the energy-absorbing member may be induced at both ends of the member upon loading.

Embodiments of energy-absorbing members described herein may be formed from any materials in which progressive crushing may be induced at an end of the energy-absorbing member, by application of an axial load through a mounting fixture having a cavity specially configured in accordance with one of the embodiments described herein, for interacting with the end of the member. It has been found that relatively brittle materials which will fail at a strain of about 2%-4% are particularly suitable for use in the energy-absorbing members described herein. Examples of suitable materials include polymer materials reinforced with chopped fibers. The fibers may be randomly distributed within the polymer matrix, or the fibers may have a predominant orientation. Glass, carbon, or other fibers may be used. Suitable base polymers may include any relatively brittle materials or grades of materials having a relatively low failure strain. Examples include various grades of polypropylenes and ABS. Particular examples of suitable materials for an energy-absorbing member include glass fiber-reinforced polypropylenes.

The cross-sectional dimensions and length L1 of an energy-absorbing member used for a given application may be determined according to the characteristics of the particular material used and other pertinent factors so that the axial loading required to buckle the member is greater than the loading required to produce the localized deformation and progressive end-crushing described herein. The energy-absorbing member configuration and suitable materials for any particular application may be determined analytically and/or experimentally, using known methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. An energy-absorbing structure comprising:
    a first mounting fixture including a base and a cavity formed in the base, the cavity having at least one wall and at least a pair of opposed flat crush initiator portions extending from the at least one wall to a solid bottom of the cavity extending between ends of the opposed flat crush initiator portions of the at least a pair of opposed flat crush initiator portions; and
    an energy-absorbing member having a portion inserted into the cavity,
    wherein the energy-absorbing member is in contact with the first mounting fixture along the at least a pair of crush initiator portions, but not along the cavity bottom, and
    wherein the at least a pair of opposed flat crush initiator portions is structured to initiate crushing of the energy-absorbing member upon application of a sufficient load to at least one of the energy-absorbing member and the first mounting fixture.

2. The energy-absorbing structure of claim 1 wherein the first mounting fixture has an energy-absorbing member insertion axis, and wherein each crush initiator portion of the at least a pair of crush initiator portions comprises a beveled surface extending along a plane forming an angle with respect to the energy-absorbing member insertion axis.

3. The energy-absorbing structure of claim 1 wherein the energy-absorbing member has a longitudinal axis, a first crush initiator portion is positioned on a first side of the longitudinal axis, and a second crush initiator portion is positioned on a second side of the longitudinal axis opposite the first side.

4. The energy-absorbing structure of claim 1 wherein each crush initiator portion of the at least a pair of crush initiator portions forms a radius between at least one cavity wall and the cavity bottom.

5. The energy-absorbing structure of claim 4 wherein each radius has a value of at least four times a wall thickness of a material from which a portion of the energy-absorbing member in contact with the crush initiator portions is fabricated.

6. The energy-absorbing structure of claim 1 wherein the energy-absorbing member has a first wall portion, a second wall portion forming a first obtuse internal angle with the first wall portion, and a third wall portion positioned opposite the second wall portion, the third wall portion forming a second obtuse internal angle with the first wall portion.

7. The energy-absorbing structure of claim 6 wherein the energy-absorbing member has a fourth wall portion opposite the first wall portion, a fifth wall portion forming a third obtuse internal angle with the fourth wall portion, and a sixth wall portion positioned opposite the fifth wall portion, the sixth wall portion forming a fourth obtuse internal angle with the fourth wall portion.

8. The energy-absorbing structure of claim 1 wherein the energy-absorbing member is formed from a fiber-reinforced polymer material.

9. An energy-absorbing structure comprising:
    a first mounting fixture including a base and a cavity formed in the base, the cavity having at least one wall, a bottom, and at least a pair of opposed crush initiator portions extending between the at least one cavity wall and the cavity bottom; and
    an energy-absorbing member having a portion inserted into the cavity,
    wherein the energy-absorbing member is in contact with the first mounting fixture along the at least a pair of crush initiator portions,
    wherein the first mounting fixture has an energy-absorbing member insertion axis, wherein each crush initiator portion of the at least a pair of crush initiator portions comprises a beveled surface extending along a plane forming an angle with respect to the energy-absorbing member insertion axis, and wherein a distance in a direction parallel to the insertion axis and extending between the cavity bottom and a plane perpendicular to the insertion axis and passing through locations where the at least a pair of crush initiator portions intersect the at least one cavity wall, is at least three times a wall thickness of a material from which a portion of the energy-absorbing member in contact with the at least a pair of crush initiator portions is fabricated.

10. The energy-absorbing structure of claim 9 wherein an angle formed between the energy-absorbing member insertion axis and a plane containing a crush initiator portion of the at least a pair of crush initiator portions is in a range of 35° to 60° inclusive.

11. The energy-absorbing structure of claim 10 wherein the angle formed between the energy-absorbing member insertion axis and the plane containing the crush initiator portion of the at least a pair of crush initiator portions is approximately 45°.

12. The energy-absorbing structure of claim 9 wherein the distance is approximately four times a wall thickness of a material from which the portion of the energy-absorbing member in contact with the at least a pair of crush initiator portions is fabricated.

13. The energy-absorbing structure of claim 9 wherein a depth of the cavity between the cavity bottom and a plane perpendicular to the insertion axis and passing through locations where the crush initiator portions intersect associated wall sections of the cavity is greater than the distance.

14. An energy-absorbing structure comprising:
a first mounting fixture including a base and a cavity formed in the base, the cavity having at least one wall, a bottom, and at least a pair of opposed crush initiator portions extending between the at least one wall and the bottom; and
an energy-absorbing member having a portion inserted into the cavity,
wherein the energy-absorbing member is in contact with the first mounting fixture along the at least a pair of crush initiator portions, but not along the cavity bottom, wherein the cavity includes a plurality of wall sections joined at ends thereof to form an enclosure, each wall section of the plurality of wall sections being positioned opposite and spaced apart from a corresponding wall portion of the energy-absorbing member, and
wherein the at least a pair of opposed crush initiator portions is structured to initiate crushing of the energy-absorbing member upon application of a sufficient load to at least one of energy-absorbing member and the first mounting fixture.

15. An energy-absorbing structure comprising:
a first mounting fixture including a base and a cavity formed in the base, the cavity having at least one wall, a bottom, and at least a pair of opposed flat crush initiator portions extending between the at least one wall and the bottom; and an energy-absorbing member having a portion inserted into the cavity, wherein the energy-absorbing member is in contact with the first mounting fixture along the at least a pair of flat crush initiator portions, but not along the cavity bottom, wherein the at least a pair of opposed flat crush initiator portions of the first mounting fixture is structured to initiate crushing of the portion of the energy-absorbing member upon application of a sufficient load to at least one of the energy-absorbing member and the first mounting fixture, the energy-absorbing structure further comprising a second mounting fixture including a base and a cavity formed in the base, the cavity being structured to receive a portion of an energy-absorbing member therein, the cavity having at least one wall, a bottom, and at least a pair of opposed flat crush initiator portions extending between the at least one wall and the bottom, and wherein another portion of the energy-absorbing member is inserted into the second mounting fixture cavity and is in contact with the second mounting fixture along the at least a pair of opposed flat second mounting fixture crush initiator portions of the second mounting fixture, and is spaced apart from the second mounting fixture cavity bottom, and wherein the at least a pair of opposed flat crush initiator portions of the second mounting fixture is structured to initiate crushing of the other portion of the energy-absorbing member upon application of a sufficient load to at least one of the energy-absorbing member and the second mounting fixture.

16. A mounting fixture for an energy-absorbing structure, the mounting fixture comprising a base and a cavity formed in the base, the cavity having a pair of opposed walls and a flat crush initiator portion extending from each wall of the pair of opposed walls and terminating in a solid bottom of the cavity, the solid bottom extending between an end of a first crush initiator portion extending from a first wall of the pair of opposed walls, and a second crush initiator portion extending from a second wall of the pair of opposed walls.

17. The mounting fixture of claim 16 further comprising an energy-absorbing member insertion axis, wherein each crush initiator portion comprises a beveled surface extending along a plane forming an angle with respect to the energy-absorbing member insertion axis.

18. The mounting fixture of claim 17 wherein each angle formed between the energy-absorbing member insertion axis and the plane along which a crush initiator portion extends is in a range of 35° to 60° inclusive.

19. The mounting fixture of claim 18 wherein each angle formed between the energy-absorbing member insertion axis and the plane along which a crush initiator portion extends is approximately 45°.

20. The mounting fixture of claim 16 wherein each crush initiator portion forms a radius between the at least one cavity wall and the cavity bottom.

* * * * *